(12) United States Patent
Jose

(10) Patent No.: US 11,508,394 B2
(45) Date of Patent: Nov. 22, 2022

(54) DEVICE AND METHOD FOR WIRELESSLY COMMUNICATING ON BASIS OF NEURAL NETWORK MODEL

(71) Applicant: Samsung Electronics Co., Ltd., Suwon-si (KR)

(72) Inventor: Williard Joshua Decena Jose, Taguig (PH)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/278,874

(22) PCT Filed: Jan. 2, 2020

(86) PCT No.: PCT/KR2020/000044
§ 371 (c)(1),
(2) Date: Mar. 23, 2021

(87) PCT Pub. No.: WO2020/141898
PCT Pub. Date: Jul. 9, 2020

(65) Prior Publication Data
US 2022/0051688 A1    Feb. 17, 2022

(30) Foreign Application Priority Data
Jan. 4, 2019    (KR) ........................ 10-2019-0001317

(51) Int. Cl.
*G10L 25/30*    (2013.01)
*G10L 19/16*    (2013.01)
(Continued)

(52) U.S. Cl.
CPC ............ *G10L 25/30* (2013.01); *G10L 19/167* (2013.01); *G10L 21/038* (2013.01); *G10L 21/0364* (2013.01)

(58) Field of Classification Search
CPC ......... G10L 25/00; G10L 19/00; G10L 21/00; G06N 3/00
See application file for complete search history.

(56) References Cited

U.S. PATENT DOCUMENTS 10,068,557 B1 *    9/2018    Engel ....................... G10H 7/10
2005/0267739 A1    12/2005    Kontio et al.
(Continued)

FOREIGN PATENT DOCUMENTS

EP    3 252 767 A1    12/2017
JP    2016-075740 A    5/2016
(Continued)

OTHER PUBLICATIONS

Kuleshov, Volodymyr, S. Zayd Enam, and Stefano Ermon. "Audio super resolution using neural networks." arXiv preprint arXiv: 1708.00853 (2017). (Year: 2017).*
(Continued)

*Primary Examiner* — Jialong He
(74) *Attorney, Agent, or Firm* — Jefferson IP Law, LLP

(57) ABSTRACT

Disclosed are a device and method for wirelessly communicating. The device according to one example embodiment of the present disclosure may comprise a transceiver and a controller connected to the transceiver, wherein the controller is configured to identify at least one additional sample on the basis of a digital signal by using a neural network model and upscale the digital signal by adding the at least one identified additional sample to a plurality of samples of the digital signal.

6 Claims, 14 Drawing Sheets

(51) Int. Cl.
*G10L 21/0364* (2013.01)
*G10L 21/038* (2013.01)

(56) References Cited

U.S. PATENT DOCUMENTS

| | | | |
|---|---|---|---|
| 2006/0265210 | A1 | 11/2006 | Ramakrishnan et al. |
| 2006/0293016 | A1 | 12/2006 | Giesbrecht et al. |
| 2008/0208572 | A1 | 8/2008 | Nongpiur et al. |
| 2013/0144614 | A1* | 6/2013 | Myllyla .............. G10L 19/0208 381/98 |
| 2016/0098993 | A1 | 4/2016 | Yamamoto et al. |
| 2017/0330586 | A1 | 11/2017 | Roblek et al. |
| 2018/0122048 | A1* | 5/2018 | Wang .................... H04N 19/59 |
| 2018/0286425 | A1 | 10/2018 | Baek et al. |
| 2020/0082843 | A1 | 3/2020 | Chang et al. |

FOREIGN PATENT DOCUMENTS

| | | | |
|---|---|---|---|
| KR | 10-2003-0033733 | A | 5/2003 |
| KR | 10-1461774 | B1 | 12/2014 |
| KR | 10-2018-0069299 | A | 6/2018 |
| KR | 10-2018-0111271 | A | 10/2018 |
| WO | 2009/029036 | A1 | 3/2009 |
| WO | 2011/148230 | A1 | 12/2011 |

OTHER PUBLICATIONS

S. Pascual, M. Park, J. Serrà, A. Bonafonte and K. -H. Ahn, "Language and Noise Transfer in Speech Enhancement Generative Adversarial Network," 2018 IEEE International Conference on Acoustics, Speech and Signal Processing (ICASSP), 2018, pp. 5019-5023, doi: 10.1109/ICASSP.2018.8462322. (Year: 2018).*
H. Taddei, C. Beaugeantand M. de Meuleneire, "Noise reduction on speech codec parameters," 2004 IEEE International Conference on Acoustics, Speech, and Signal Processing, 2004, pp. I-497, doi: 10.1109/ICASSP.2004.1326031. (Year: 2004).*
Kontio, Juho, Laura Laaksonen, and Paavo Alku. "Neural network-based artificial bandwidth expansion of speech." IEEE transactions on audio, speech, and language processing 15.3 (2007): 873-881. (Year: 2007).*
Sun, Shengyang, "CSC411 Tutorial #5, Neural Networks", [online], 2017. (Year: 2017).*
Laaksonen; "Artificial bandwidth extension of narrowband speech—enhanced speech quality and intelligibility in mobile devices"; Department of Signal Processing and Acoustics; Aalto University; School of Electrical Engineering Espoo; 2013.
Zhao et al.; "Convolutional Neural Networks to Enhance Coded Speech"; IEEE/ACM Transactions on Audio, Speech, and Language Processing; vol. 27, No. 4; Apr. 2019.
Kuleshov et al.; "Audio Super-Resolution Using Neural Nets"; Department of Computer Science Stanford University; Workshop track—ICLR 2017.
Fisher et al.; WaveMedic: Convolutional Neural Networks For Speech Audio Enhancement; Stanford University XP055728399; http://cs229.stanford.edu/proj2016/report/FisherScherlis-WaveMedic-project.pdf; Jan. 1, 2016.
European Search Report dated Oct. 21, 2021; European Appln. No. 20736167.6-1207 / 3843092 PCT/KR2020000044.

* cited by examiner

DEVICE AND METHOD FOR WIRELESSLY COMMUNICATING ON BASIS OF NEURAL NETWORK MODEL

CROSS-REFERENCE TO RELATED APPLICATION(S)

This application is a National Phase Entry of PCT International Application No. PCT/KR2020/000044, which was filed on Jan. 2, 2020 and claims priority to Korean Patent Application No. 10-2019-0001317 which was filed on Jan. 4, 2019, in the Korean Intellectual Property Office, the contents of which are incorporated herein by reference.

TECHNICAL FIELD

The technical spirit of the present disclosure relates to a device and a method of operating the same, and more particularly, to a device for performing wireless communication based on a neural network model and a method of operating the same.

BACKGROUND ART

Neural network refers to a computational architecture modeling the biological brain. With the recent development of neural network technology, there is ongoing active research on analyzing input data and extracting useful information using neural network devices in various types of electronic systems.

In wireless communication, the quality of a signal may be determined depending on the state of the network carrying the signal. Particularly, wireless communication in a narrowband network may frequently experience signal degradation due to loss of signal frames. To perform smooth communication regardless of the state of the wireless communication network, a need exists for a technology capable of recovering the degraded signal to the original signal at the side of receiving the signal.

DETAILED DESCRIPTION OF THE INVENTION

Technical Problem

The technical spirit of the present invention relates to a device and method for performing wireless communication based on a neural network model and provides a device and method for upscaling digital signals.

Technical Solution

To achieve the foregoing objectives, according to an aspect of the technical spirit of the disclosure, a device for wireless communication comprises a transceiver and a controller connected to the transceiver, wherein the controller is configured to identify at least one additional sample using a neural network model, based on a digital signal and upscale the digital signal by adding the identified at least one additional sample to a plurality of samples of the digital signal.

According to another aspect of the technical spirit of the disclosure, a method for wireless communication comprises identifying at least one additional sample using a neural network model, based on a digital signal and upscaling the digital signal by adding the identified at least one additional sample to a plurality of samples of the digital signal.

According to still another aspect of the technical spirit of the disclosure, there is provided a computer-readable recording medium storing a program for implementing a method of operation by a controller.

Advantageous Effects

According to the disclosure, there may be provided a device and method capable of upscaling digital signals based on a neural network model. There may also be provided a device and method capable of obtaining digital signals with further enhanced signal quality by generating a neural network model based on a reference digital signal.

MODE FOR CARRYING OUT THE INVENTION

Hereinafter, embodiments of the present invention are described in detail with reference to the accompanying drawings.

Figure 1:
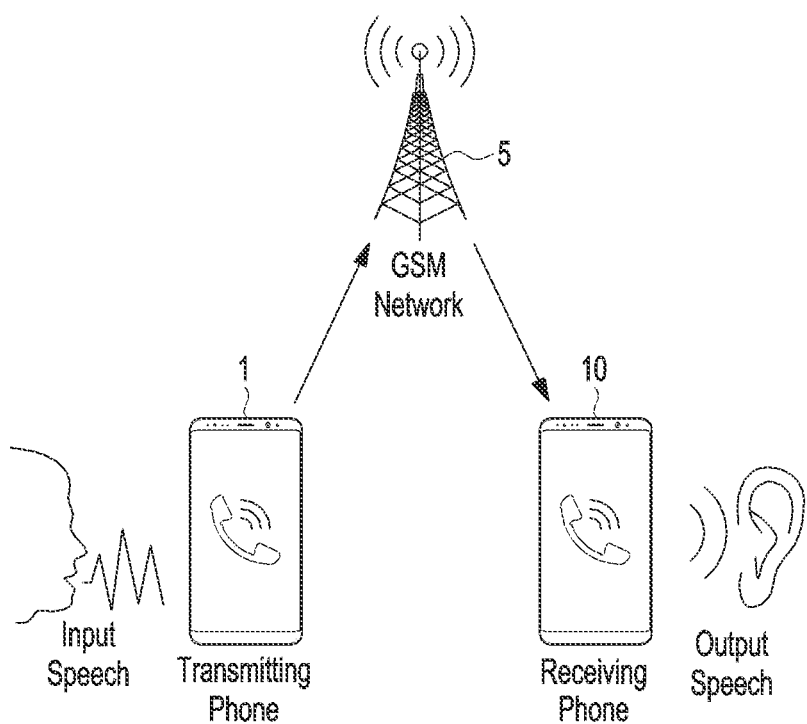
FIG. 1 illustrates a wireless communication system according to an example embodiment of the disclosure.

FIG. 1 illustrates a wireless communication system according to an example embodiment of the disclosure.

Referring to FIG. 1, a wireless communication system may include a transmitting terminal 1, a base station 5, and a receiving terminal 10.

The base station 5 may wirelessly communicate with the terminals 1 and 10 through one or more base station antennas. The wireless communication network supported by the base station 5 may support communication by multiple users by sharing available network resources. For example, information may be transferred over the wireless communication network in various schemes, such as global system for mobile communication (GSM), code division multiple access (CDMA), frequency division multiple access (FDMA), time division multiple access (FDMA), orthogonal frequency division multiple access (OFDMA), or single carrier frequency division multiple access (SC-FDMA).

The wireless communication network supported by the base station 5 may transmit speech signals. For example, in the wireless communication network, speech signals may be transmitted in various ways, such as GSM or voice over long term evolution (VoLTE). In the GSM scheme, the bandwidth may be limited to 4 kHz.

Speech signals exchanged between the terminals 1 and 10 may be compressed using an adaptive multi-rate (AMR) audio codec, and may be encoded or decoded.

Although one base station 5 is shown in the drawings, this is merely for convenience of description, and the wireless communication system may include various numbers of base stations (e.g., macro, micro, and/or pico base stations).

The base station 5 may provide communication coverage for a predetermined geographical area. In some examples, the base station 5 may also be termed, e.g., base transceiver station (BTS), radio base station, access point (AP), radio transceiver, NodeB, eNodeB (eNB), or be named in other adequate terms.

The terminals 1 and 10 may denote various devices that are wireless communication devices, whether stationary or mobile and are capable of transmitting and receiving data and/or control information by communicating with the base station 5. For example, the terminals 1 and 10 may be termed terminal equipment, mobile station (MS), mobile terminal (MT), user terminal (UT), subscribe station (SS), wireless device, or handheld device.

The transmitting terminal 1 may receive an analog speech signal and convert it into a digital signal. The transmitting terminal 1 may transmit the converted digital speech signal to the receiving terminal 10 through the base station 5. The receiving terminal 10 may receive the digital speech signal and convert it into an analog signal. The receiving terminal 10 may output the converted analog speech signal through a speaker built in the receiving terminal 10.

In an example embodiment, the terminals 1 and 10 may modulate analog signals into digital signals or digital signals into analog signals through a pulse code modulation (PCM) scheme.

Figure 2:
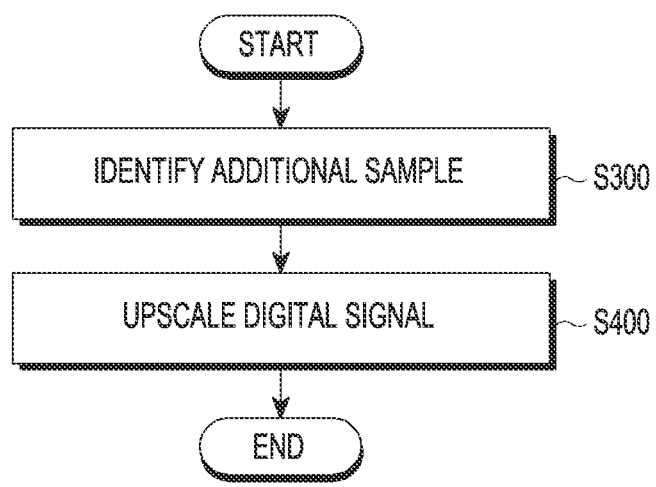
FIG. 2 is a flowchart illustrating operations of a device according to an example embodiment of the disclosure.

FIG. 2 is a flowchart illustrating operations of a device according to an example embodiment of the disclosure.

Referring to FIG. 2, a device 10 may identify at least one additional sample (S300). In an example embodiment, the device 10 may identify at least one additional sample based on an input digital signal. In another example embodiment, the device 10 may identify at least one additional sample using a neural network model based on an input digital signal. For example, the at least one additional sample may be a sample that does not correspond to a plurality of samples of the input digital signal.

Next, the device 10 may upscale the digital signal (S400). In an example embodiment, the device 10 may upscale the digital signal by adding the identified at least one additional sample to the plurality of samples of the input digital signal. For example, the upscaled digital signal may have a higher sampling rate than the input digital signal.

Figure 3:
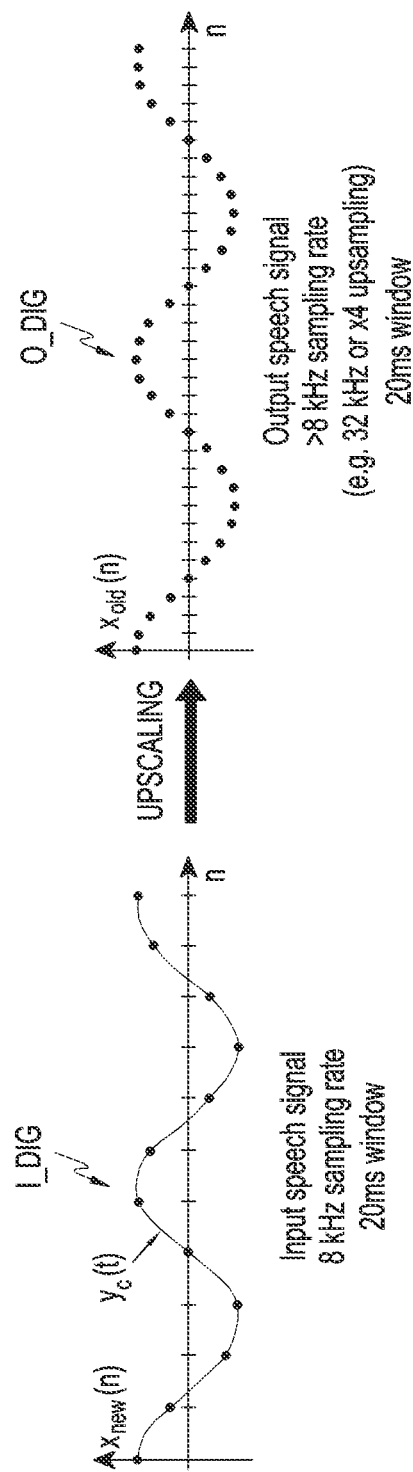
FIG. 3 illustrates an embodiment in which a device upscales a digital signal according to an embodiment of the disclosure.

FIG. 3 illustrates an embodiment in which a device upscales a digital signal according to an embodiment of the disclosure.

Referring to FIG. 3, the device 10 may upscale an input speech signal I_DIG, outputting an output speech signal O_DIG. For example, the input speech signal and the output speech signal are digital signals.

In an example embodiment, the device 10 may receive and decode the encoded input speech signal I_DIG. For example, encoding and decoding may be based on an AMR scheme. In another example embodiment, the decoded input speech signal I_DIG may have a sampling rate of 8 kHz and a quantization level of 13 bits and may be divided into frames with a length of 20 ms.

In yet another example embodiment, the output speech signal O_DIG may have a higher sampling rate than the input speech signal I_DIG. For example, the output speech signal O_DIG may be upsampled n times and may have a sampling rate of 32 kHz in response to the input speech signal I_DIG of 8 kHz. In another example embodiment, the output speech signal O_DIG may have frames having the same length as the input speech signal I_DIG, and the output speech signal O_DIG may have a higher quantization level than the input speech signal I_DIG.

Figure 4:
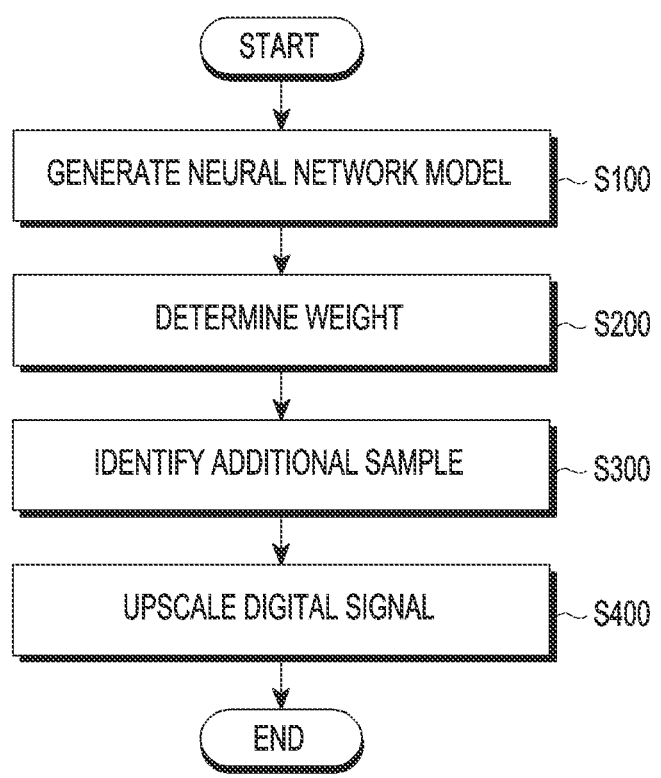
FIG. 4 is a flowchart illustrating operations of a device according to an example embodiment of the disclosure.

FIG. 4 is a flowchart illustrating operations of a device according to an example embodiment of the disclosure. The components shown in FIG. 4, which overlap those of FIG. 2, are not described below.

Referring to FIG. 4, a device 10 may generate a neural network model (S100). In an example embodiment, the device 10 may train the neural network model by inputting digital signals to the neural network model and feeding information related to the digital signals output from the neural network model back to the neural network model.

In another example embodiment, the device 10 may input a pre-processed reference digital signal to the neural network model and feed the difference between the digital signal output from the neural network model and the non-preprocessed reference digital signal to the neural network model, thereby training the neural network model.

In another example embodiment, the device 10 may include a neural network model that has already been generated through learning. For example, the neural network model may be stored in a memory built in the device 10. If necessary, the device 10 may read the stored neural network model from the memory.

Next, the device 10 may determine a weight based on the input digital signal (S200). In an example embodiment, the device 10 may determine the weight using the neural network model. For example, the neural network model may modify the weight so that the digital signal output from the neural network model in response to the pre-processed reference digital signal becomes similar to the non-preprocessed reference digital signal.

Next, the device 10 may identify at least one additional sample (S300). In an example embodiment, the device 10 may identify at least one additional sample based on the input digital signal and the determined weight. For example, the at least one additional sample may be a sample that does not correspond to a plurality of samples of the input digital signal.

Figure 5:
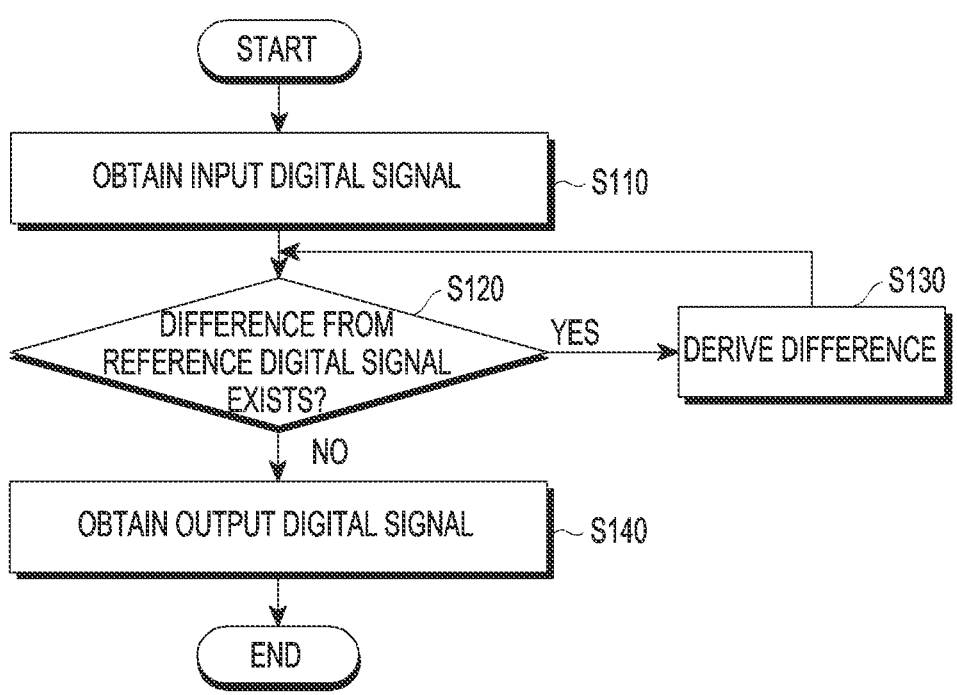
FIG. 5 is a view illustrating an example of generating a neural network model according to an example embodiment of the disclosure.

FIG. 5 is a view illustrating an example of generating a neural network model according to an example embodiment of the disclosure.

Referring to FIG. 5, the device 10 may obtain a first input digital signal (S110). In an example embodiment, the device 10 may upscale the first input digital signal using a neural network model.

In another example embodiment, the device 10 may input the first input digital signal to the neural network model and add at least one additional sample identified from the neural network model based on the first input digital signal to the first input digital signal, thereby upscaling the first input digital signal. For example, the neural network model may identify at least one additional sample based on the first input digital signal and a predetermined weight.

Next, the device 10 may determine whether there is a difference between the first output digital signal upscaled from the first input digital signal and a reference digital signal (S120). In an example embodiment, the difference may be related to at least one sample that does not correspond to a plurality of samples of the first output digital signal among a plurality of samples of the reference digital signal.

If there is a difference, the device 10 may derive the difference (S130). In an example embodiment, the device 10 may input the derived difference and a second input digital signal to the neural network model and add at least one additional sample identified from the neural network model to the second input digital signal, thereby upscaling the second input digital signal. For example, the neural network model may identify at least one additional sample based on the derived difference, the second input digital signal, and a predetermined weight. In another example embodiment, the neural network model may modify the weight so that no difference occurs between the reference digital signal and the second output digital signal based on the input of the derived difference.

If there is no difference, the device 10 may obtain the first output digital signal upscaled from the first input digital signal as an output digital signal (S140). In an example embodiment, the device 10 may obtain the weight applied to the neural network model when there is no difference. For example, the device 10 may provide the obtained weight to the neural network model to apply to upscaling a next input digital signal by the neural network model.

Figure 6:
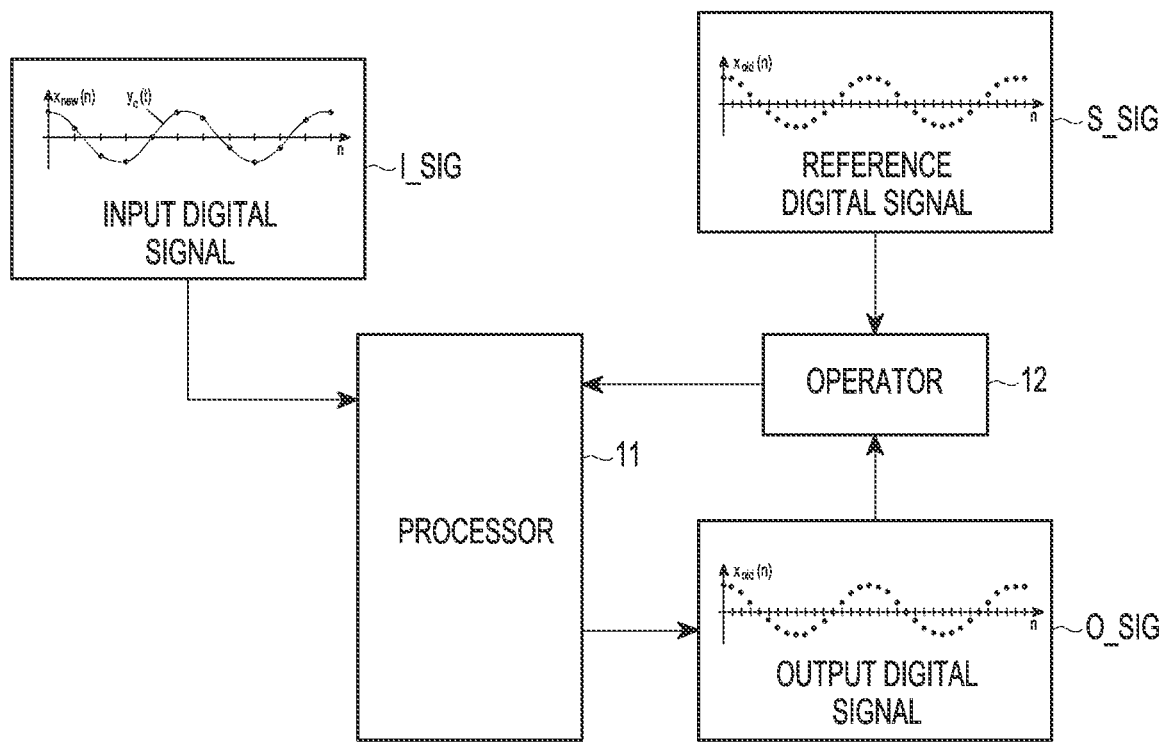
FIG. 6 illustrates an embodiment in which a device generates a neural network model according to an example embodiment of the disclosure.

FIG. 6 illustrates an embodiment in which a device generates a neural network model according to an example embodiment of the disclosure.

Referring to FIG. 6, the device 10 may include a processor 11 that upscales the input digital signal I_SIG. In an example embodiment, the processor 11 may include a neural network model.

The processor 11 may generate an output digital signal O_SIG by upscaling the input digital signal I_SIG. In an example embodiment, the processor 11 may input the input digital signal I_SIG to the neural network model and obtain an output digital signal O_SIG from the neural network model. For example, the neural network model may determine the output digital signal O_SIG based on the input digital signal I_SIG and a predetermined weight.

The device 10 may include an operator 12 that obtains a difference between the output digital signal O_SIG and the reference digital signal S_SIG. For example, the reference digital signal S_SIG may be one from a reference digital signal set including a plurality of reference digital signals, and the reference digital signal set may include speech signals in various languages and speech signals in various user samples.

The operator 12 may derive at least one sample not corresponding to the plurality of samples of the output digital signal O_SIG among the plurality of samples of one reference digital signal S_SIG as the difference. The operator 12 may feed back the derived difference to the processor 11.

In an example embodiment, the processor 11 may modify the weight applied to upscaling in the neural network model so that no difference occurs between the reference digital signal S_SIG and the output digital signal O_SIG based on the difference received from the operator 12.

In another example embodiment, the processor 11 may input the input digital signal I_SIG and the difference received from the operator 12 to the neural network model and obtain the output digital signal O_SIG from the neural network model. The neural network model may determine the output digital signal O_SIG based on the input digital signal I_SIG, a predetermined weight, and the difference received from the operator 12.

Figure 7:
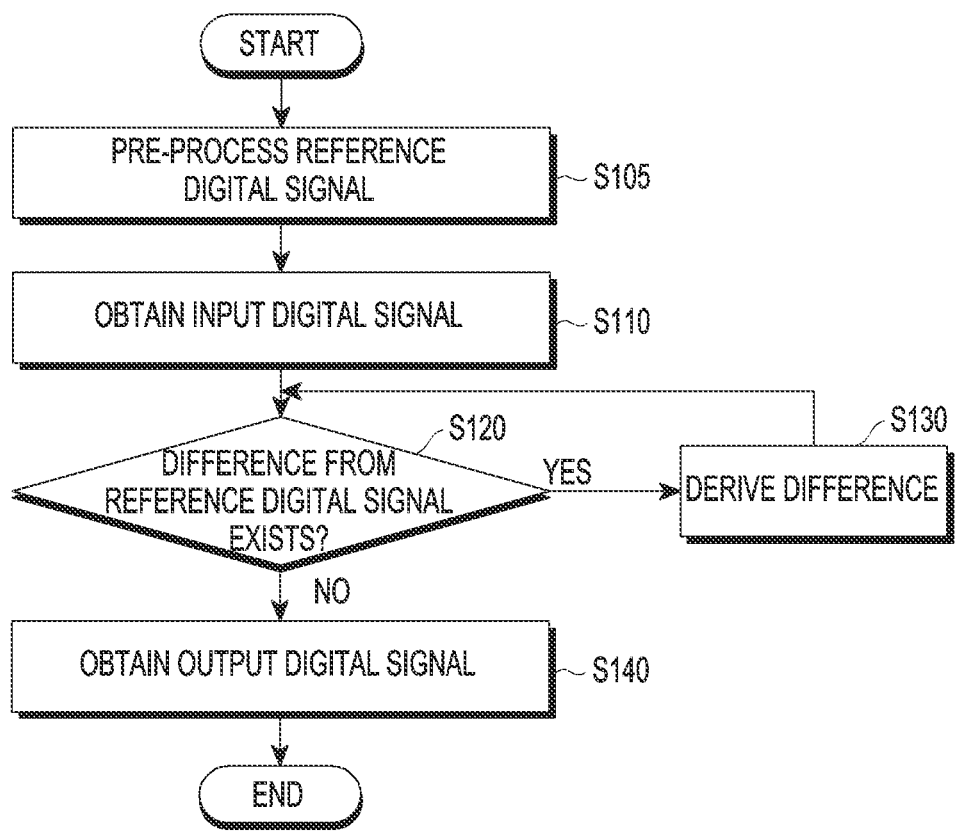
FIG. 7 is a view illustrating an example of generating a neural network model according to an example embodiment of the disclosure.

FIG. 7 is a view illustrating an example of generating a neural network model according to an example embodiment of the disclosure. The components shown in FIG. 7, which overlap those of FIG. 5, are not described below.

Referring to FIG. 7, the device 10 may pre-process the reference digital signal (S105). In an example embodiment, the pre-processing of the reference digital signal may be the process of encoding the reference digital signal, adding noise to the encoded reference digital signal, and decoding the noise-added, encoded reference digital signal. The order of encoding, noise addition, and decoding for pre-processing the reference digital signal may be changed.

In another example embodiment, the pre-processing of the reference digital signal may correspond to the process of simulating signal transmission through a wireless communication network.

Next, the device 10 may obtain the pre-processed reference digital signal as the first input digital signal (S110).

Next, the device 10 may determine whether there is a difference between the first output digital signal upscaled from the first input digital signal and a non-preprocessed reference digital signal (S120). In an example embodiment, the difference may be related to at least one sample that does not correspond to a plurality of samples of the first output digital signal among a plurality of samples of the non-preprocessed reference digital signal.

If there is a difference, the device 10 may derive the difference (S130). In an example embodiment, the device 10 may input the derived difference and a second input digital signal, which is resultant from pre-processing the reference digital signal, to the neural network model and add at least one additional sample identified from the neural network model to the second input digital signal, thereby upscaling the second input digital signal. For example, the neural network model may identify at least one additional sample based on the derived difference, the second input digital signal resultant from pre-processing the reference digital signal, and a predetermined weight. In another example embodiment, the neural network model may modify the weight so that no difference occurs between the reference digital signal and the second input digital signal resultant from the reference digital signal based on the input of the derived difference.

Figure 8:
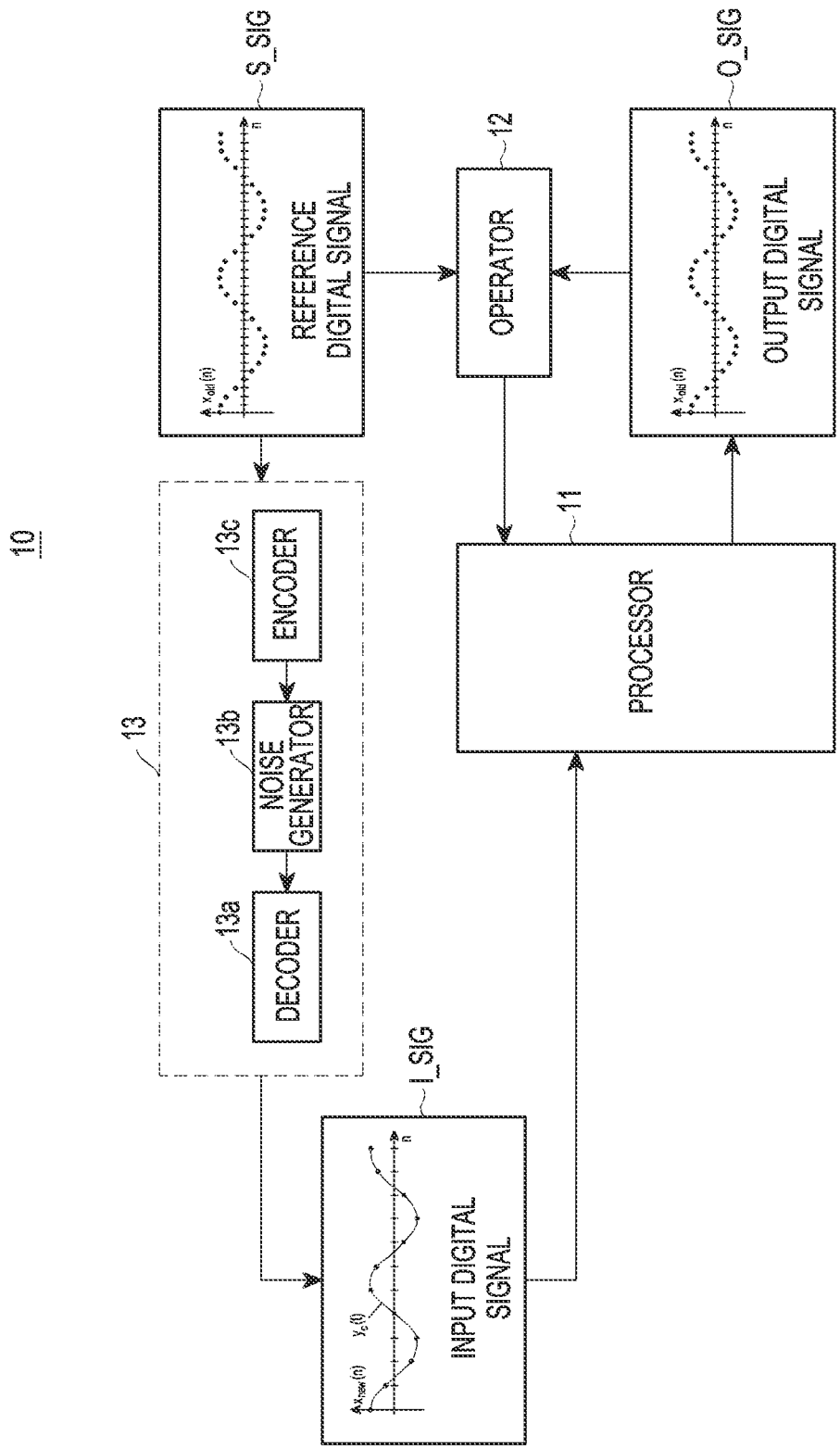
FIG. 8 illustrates an embodiment in which a device generates a neural network model according to an example embodiment of the disclosure.

FIG. 8 illustrates an embodiment in which a device generates a neural network model according to an example embodiment of the disclosure. The components shown in FIG. 8, which overlap those of FIG. 6, are not described below.

Referring to FIG. 8, the device 10 may further include a simulation module 13 that simulates transmission of signals over a network. In an example embodiment, the simulation module 13 may include an encoder 13c, a noise generator 13b, and a decoder 13a.

The simulation module 13 may generate an input digital signal I_SIG by pre-processing a received reference digital signal S_SIG. In an example embodiment, the encoder 13c may encode the reference digital signal S_SIG, the noise generator 13b may add noise to the encoded reference digital signal, and the decoder 13a may decode the noise-added, encoded reference digital signal. For example, the order of operation of the encoder 13c, the noise generator 13b, and the decoder 13a for the reference digital signal S_SIG may be changed.

The processor 11 may generate an output digital signal O_SIG by upscaling the input digital signal I_SIG resultant from pre-processing the reference digital signal.

The operator 12 may derive at least one sample not corresponding to the plurality of samples of the output digital signal O_SIG among the plurality of samples of the non-preprocessed reference digital signal S_SIG as the difference. The operator 12 may feed back the derived difference to the processor 11.

In an example embodiment, the processor 11 may modify the weight applied to upscaling in the neural network model so that no difference occurs between the non-preprocessed reference digital signal S_SIG and the output digital signal O_SIG based on the difference received from the operator 12.

In another example embodiment, the processor 11 may input the input digital signal I_SIG, which is resultant from pre-processing the reference digital signal S_SIG, and the difference received from the operator 12 to the neural network model and obtain the output digital signal O_SIG from the neural network model. The neural network model may determine the output digital signal O_SIG based on the input digital signal I_SIG resultant from pre-processing the reference digital signal S_SIG, a predetermined weight, and the difference received from the operator 12.

Figure 9:
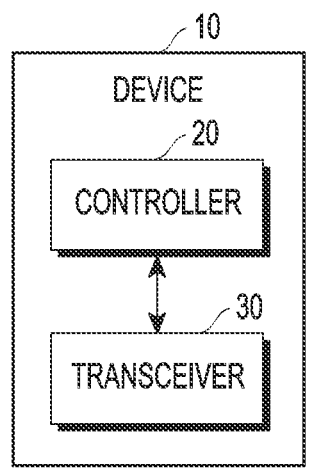
FIG. 9 is a block diagram illustrating a device according to an example embodiment of the disclosure.

FIG. 9 is a block diagram illustrating a device according to an example embodiment of the disclosure.

Referring to FIG. 9, a device 10 may include a controller 20 and a transceiver 30. Although not shown, the device 10 may additionally include various components, such as a memory.

In an example embodiment, the memory may store a kernel, middleware, an application programming interface (API), and an application as a program (or software). At least part of the kernel, middleware, or API may be denoted as an operating system. The kernel may control or manage system resources (e.g., a controller or memory) used to execute operations or functions implemented on the program, for example. The middleware may play an intermediary role so that, e.g., an API or an application may communicate with the kernel to exchange data. The application may be implemented to perform various upscaling effects on a signal obtained through the transceiver 30, for example.

The transceiver 30 may include a communication module, such as an antenna. In an example embodiment, the transceiver 30 may receive the digital signal transmitted through a wireless communication network. For example, the transceiver 30 may transmit a digital signal taken in the time domain to the controller 20.

The controller 20 may include one or more processors. In an example embodiment, the controller 20 may control the transceiver 30 to receive digital signals. In another example embodiment, the controller 20 may receive a digital signal in a time band from the transceiver 30, modulate the digital signal in the time band, and output an analog signal in a time band.

In another example embodiment, the controller 20, as one processor, may perform all of control operations performed by the device 10, such as those performed by the processor 11, the operator 12, and the simulation module 13.

Further, although not shown, the controller 20 may include the processor 11, the operator 12, and the simulation module 13. For example, the processor 11 may generate an output digital signal O_SIG by upscaling the input digital signal I_SIG. The operator 12 may derive a difference by comparing, e.g., one reference digital signal S_SIG and the output digital signal O_SIG. The simulation module 13 may pre-process, e.g., the reference digital signal.

For example, the processor 11 may input the input digital signal I_SIG to the neural network model and obtain an output digital signal O_SIG from the neural network model. For example, the neural network model may be driven through one or more operation devices among a central processing unit (CPU), a graphic processing unit (GPU), and a neural processing unit (NPU).

Figure 10:
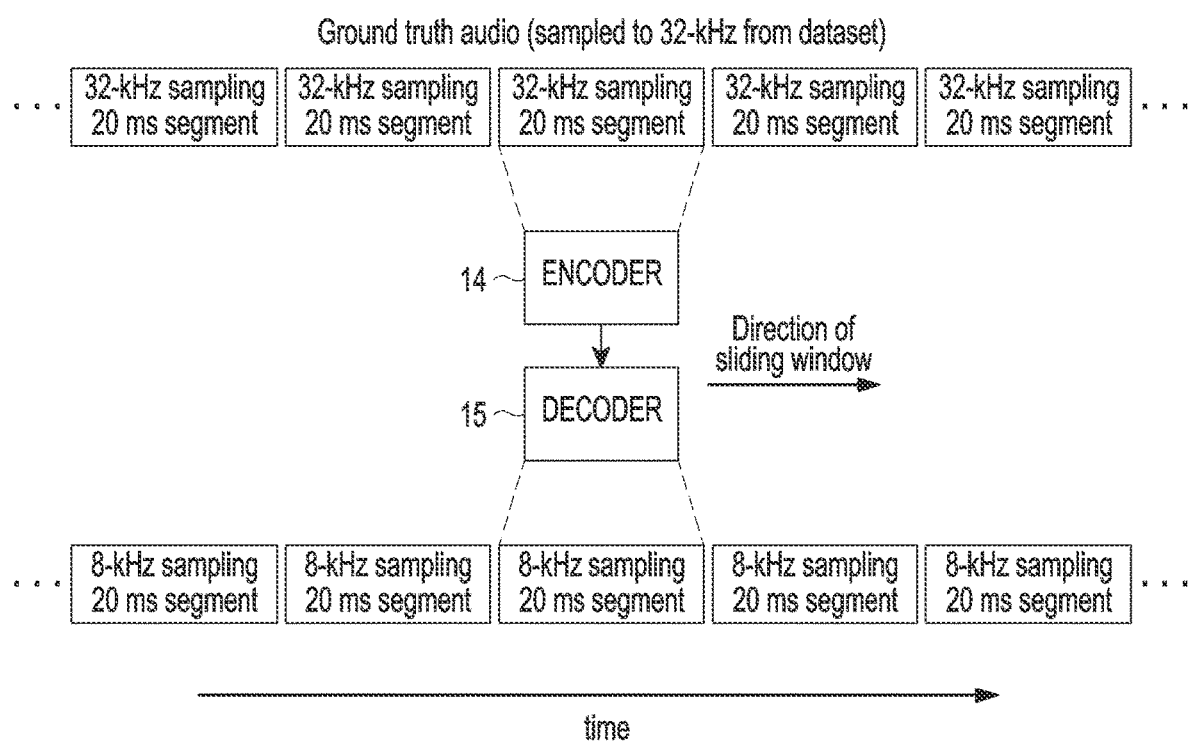
FIG. 10 is a view illustrating an example of network simulation according to an example embodiment of the disclosure.

FIG. 10 is a view illustrating an example of network simulation according to an example embodiment of the disclosure.

Referring to FIG. 10, one reference digital signal of a dataset including one or more reference digital signals (Ground Truth audio) may pass through the encoder 14 and the decoder 15 and, as an input digital signal, may then be input to the neural network model. In an example embodiment, the reference digital signal may have a sampling rate of 32 kHz. In another example embodiment, the reference digital signal may be divided into frames having a length of 20 ms.

The reference digital signal may be input to the encoder 14 and be encoded. The encoded reference digital signal may be input to the decoder 15 and decoded. In an example embodiment, the process of encoding and decoding the reference digital signal may correspond to the process of simulating signal transmission through a wireless communication network. In another example embodiment, the reference digital signal may be encoded and decoded for each frame having a predetermined time length. For example, the time length of the frame may be 20 ms. In another example embodiment, the encoder 14 and the decoder 15 may use an adaptive multi-rate (AMR) scheme.

The reference digital signal passing through the encoder 14 and the decoder 15, as an input digital signal, may be input to the neural network. In an example embodiment, the input digital signal may be downscaled as compared with the reference digital signal. For example, the input digital signal may have a sampling rate of 8 kHz. In another example embodiment, the input digital signal may be divided into frames having the same time length as the reference digital signal. For example, the input digital signal may be composed of frames having a length of 20 ms.

Figure 11:
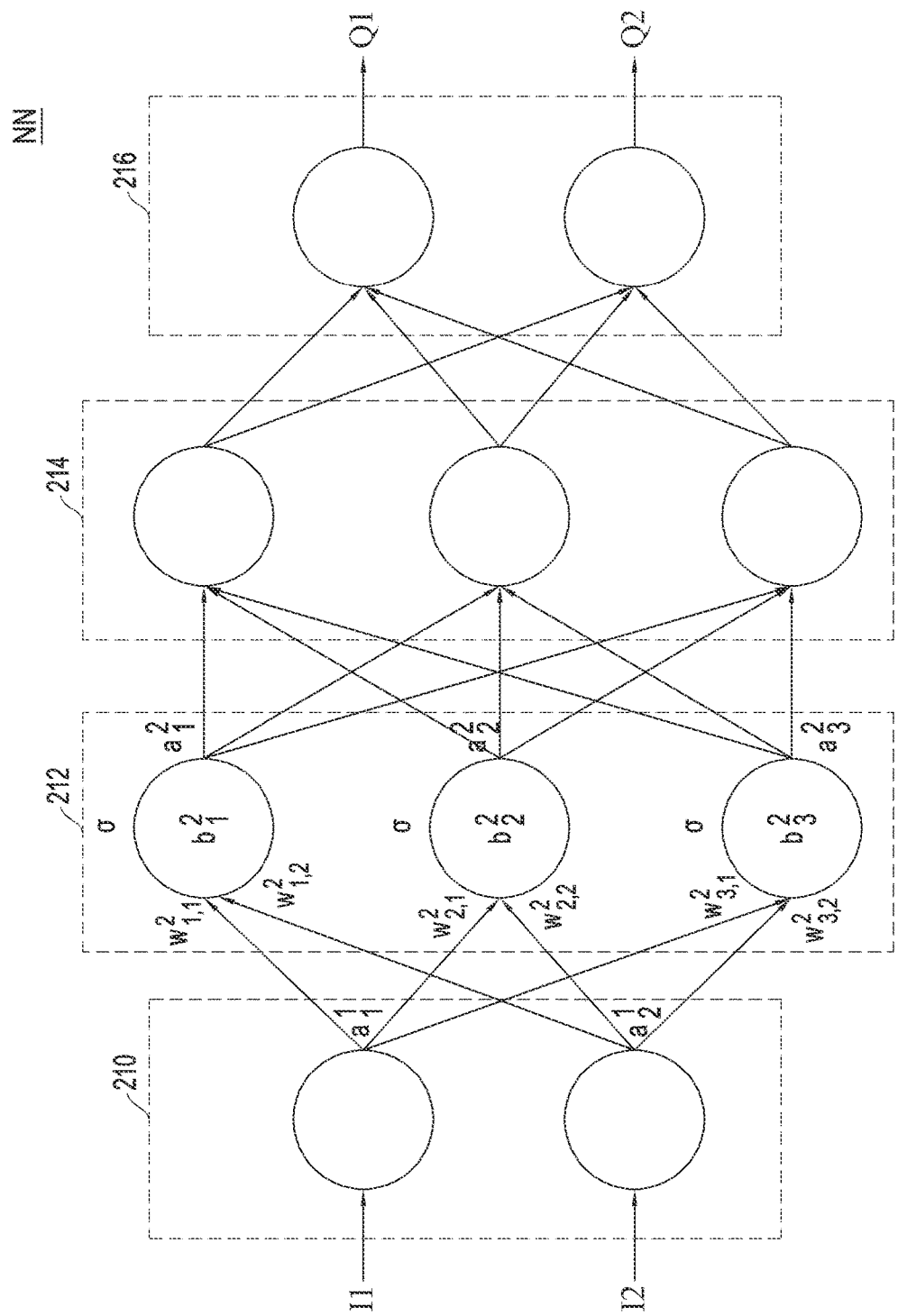
FIG. 11 is a view illustrating an example neural network model according to an example embodiment of the disclosure.

FIG. 11 is a view illustrating an example neural network model according to an example embodiment of the disclosure.

Referring to FIG. 11, a neural network (NN) may have a structure including an input layer, hidden layers, and an output layer. The neural network (NN) may perform an operation based on received input data (e.g., I1 or I2) and generate output data (e.g., Q1 or Q2) based on a result of the operation. In an example embodiment, the neural network (NN) may be employed in the device 10 and thus receive the input digital signal I_SIG and generate an output digital signal O_SIG close to the reference digital signal S_SIG.

The neural network (NN) may be a deep neural network (DNN) or an n-layer neural network including two or more hidden layers. For example, as illustrated in FIG. 11, the neural network (NN) may be a DNN including an input layer 210, first and second hidden layers 212 and 213, and an output layer 216. The DNN may include, but is not limited to, convolution neural networks (CNN), recurrent neural networks (RNN), deep belief networks, or restricted Boltzmann machines.

When the neural network (NN) has a DNN structure, it includes more layers capable of extracting effective information. Thus, the neural network (NN) may process complex data sets. Although the neural network (NN) is shown to include four layers 210, 212, 214, and 216, this is merely an example and the neural network (NN) may include fewer or more layers. Further, the neural network (NN) may include layers of various structures different from those illustrated in FIG. 11.

Each of the layers 210, 212, 214, and 216 included in the neural network (NN) may include a plurality of neurons. The neuron may correspond to a plurality of artificial nodes, known as processing elements (PEs) or units or by similar terms. For example, as illustrated in FIG. 11, the input layer 210 may include two neurons (nodes), and the first and second hidden layers 212 and 214 each may include three neurons (nodes). However, this is merely an example, and each of the layers included in the neuron network (NN) may include various numbers of neurons (nodes).

The neurons included in each of the layers included in the neuron network (NN) may be connected to one other to exchange data. One neuron may receive data from other neurons, perform operation, and output the results of operation to other neurons.

The input and output of each of the neurons (nodes) may be denoted an input activation and output activation. In other words, an activation may be a parameter that is an output from one neuron and inputs of the neurons included in the next layer. Meanwhile, each neuron may determine its own activation based on activations and weights received from neurons included in the previous layer. The weight is a parameter used to calculate the output activation in each neuron and may be a value assigned to a connection relationship between neurons.

Each of the neurons may be processed by a computational unit or a processing element that receives inputs and outputs activations, and the input-output of each of the neurons may be mapped. For example, a may be the activation function, and $w_{j,k}^i$ may be the weight value from the k-th neuron included in the (i-1)-th layer to the j-th neuron included in the i-th layer. $b_j^i$ may be the bias value of the j-th neuron included in the i-th layer, and $a_j^i$ may be referred to as the activation of the j-th neuron of the i-th layer, that is, a post activation. The post activation $a_j^i$ may be calculated using Equation 1 below.

$$a_j^i = \sigma\left(\sum_k (w_{j,k}^i \times a_k^{i-1}) + b_j^i\right) \quad \text{Equation 1}$$

As illustrated in FIG. 11, the post activation of the first neuron of the first hidden layer 212 may be represented as $a_1^2$. Also, $a_1^2$ may have the value $a_1^2 = \sigma(w_{1,1}^2 \times a_1^1 + w_{1,2}^2 \times a_2^1 + b_1^2)$ according to Equation 1. In other words, the post activation may be a value obtained by applying an activation function to the sum of the activations received from the previous layer. However, Equation 1 is merely an example for describing the activation and weight used to process data in a neural network, and embodiments of the disclosure are not limited thereto.

Figure 12:
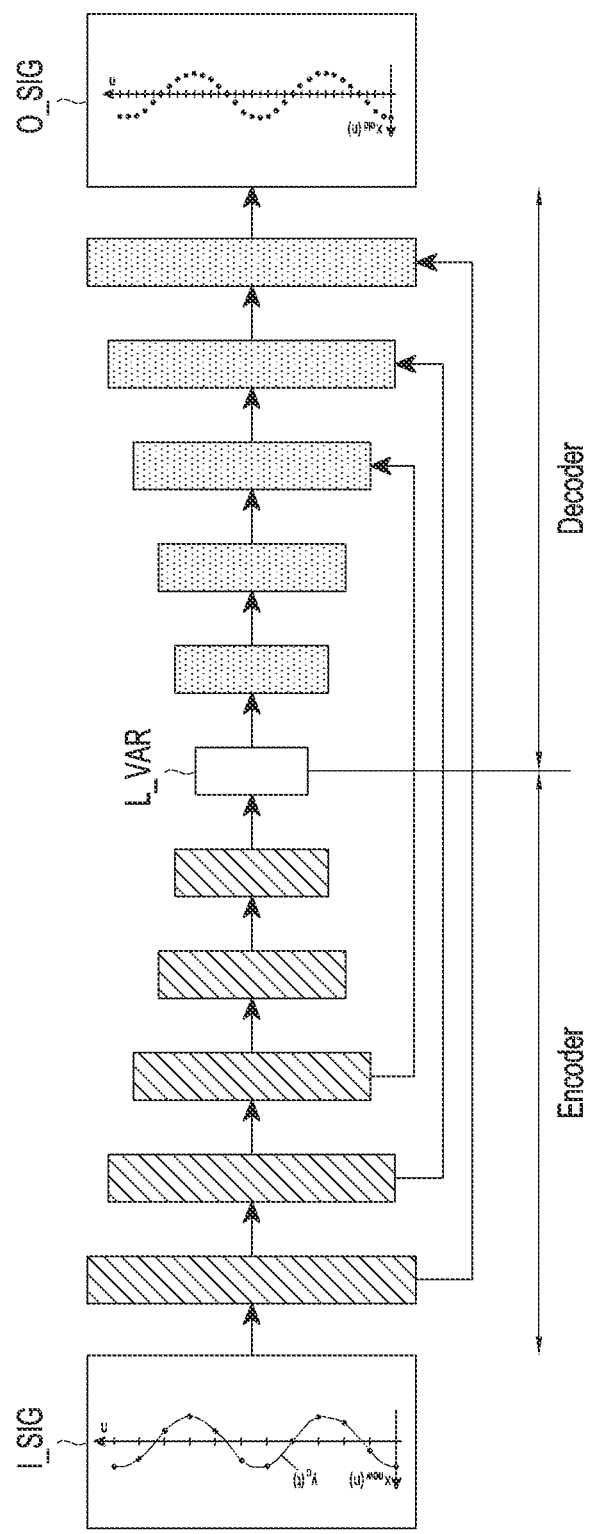
FIG. 12 illustrates an embodiment of upscaling a digital signal based on a neural network model according to an example embodiment of the disclosure.

FIG. 12 illustrates an embodiment of upscaling a digital signal based on a neural network model according to an example embodiment of the disclosure.

Referring to FIG. 12, an input digital signal I_SIG may be input to a neural network model and processed in each layer L_VAR, and may thus be upscaled to an output digital signal O_SIG. In an example embodiment, each layer L_VAR of the neural network model may model an encoder and a decoder.

In another example embodiment, the layers L_VAR on the encoder side may be connected to the layers L_VAR on the decoder side. For example, in the case of the downsampling layer L_VAR on the encoder side, skip connections for the layer L_VAR on the decoder side corresponding thereto may be added.

In another example embodiment, each layer L_VAR of the neural network model may be trained from digital signals and generated.

In another example embodiment, the loss function of the neural network may be calculated using Equation 2.

$$\text{Loss} = \Sigma(x_{i,output} - \hat{x}_{i,ground\ truth})^2 \quad \text{Equation 2}$$

Figure 13:
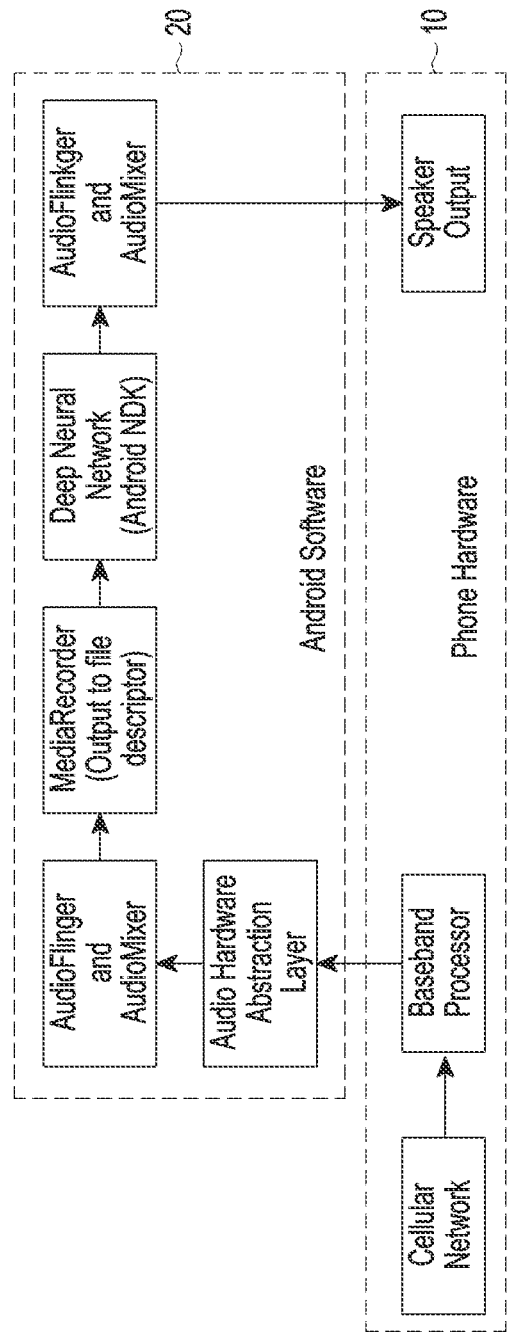
FIG. 13 is a block diagram illustrating a configuration of a device according to an example embodiment of the disclosure.

FIG. 13 is a block diagram illustrating a configuration of a device according to an example embodiment of the disclosure.

Referring to FIG. 13, the operation of the present invention may include operations performed at the device 10 level and operations performed at the controller 20 level. As an operation performed at the device 10 level, a digital signal from a cellular network may be received by a baseband processor. Further, the digital signal output from the controller 20 may be output as a speaker output. To that end, the device 10 may modulate, e.g., a digital signal into an analog signal and output the same through a speaker.

As an operation performed at the controller 20 level, the controller 20 may access the digital signal through an audio hardware abstraction layer and introduce the digital signal to an AudioFlinger/AudioMixer. The AudioFlinger/AudioMixer may deliver the incoming digital signal to a MediaRecorder, and the MediaRecorder may input a narrowband modulated digital signal to a Deep Neural Network. The Deep Neural Network may receive and process the narrowband modulated digital signal, generating a broadband modulated digital signal. The broadband modulated digital signal output from the Deep Neural Network may be returned to the AudioFlinger/AudioMixer for output on the speaker.

Figure 14:
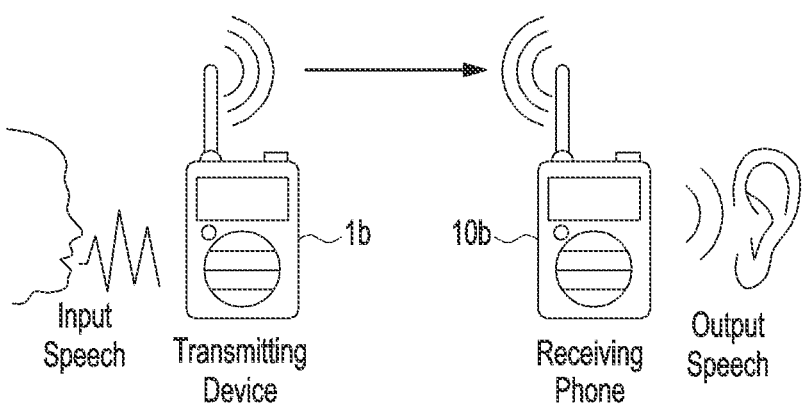
FIG. 14 illustrates a wireless communication system according to an example embodiment of the disclosure.

FIG. 14 illustrates a wireless communication system according to an example embodiment of the disclosure.

Referring to FIG. 14, a wireless communication system may include a transmitting terminal 1b and a receiving terminal 10b. In an example embodiment, the transmitting terminal 1b may receive an analog speech signal and convert it into a digital signal. Signals exchanged between the terminals 1b and 10b may not require a base station. The receiving terminal 10b may receive the digital speech signal and convert it into an analog signal. The receiving terminal 10b may output the converted analog speech signal through a speaker built in the receiving terminal 10b.

Example embodiments have been described above in connection with the drawings. Although the embodiments have been described with reference to specific terms, this is intended simply for describing the technical spirit of the disclosure and should not be interpreted as limiting the scope of the disclosure which is defined by the appended claims. It will be apparent to one of ordinary skill in the art that various changes may be made thereto without departing from the scope of the disclosure. Accordingly, the scope of the present invention should be determined by the technical spirit of the invention as claimed in the claims.

The invention claimed is:

1. A device for wireless communication, the device comprising:
   a transceiver; and
   a controller connected to the transceiver, wherein the controller is configured to:
      determine a weight based on a first input digital signal,
      identify at least one additional sample using a neural network model, based on the first input digital signal and the weight, and
      upscale the first input digital signal by adding the identified at least one additional sample to a plurality of samples of the first input digital signal,
   wherein the neural network model modifies the weight to reduce a difference between the upscaled first input digital signal and a reference digital signal,
   wherein the difference is obtained based on at least one sample of the reference digital signal which does not correspond to any of the plurality of samples of the upscaled first input digital signal,
   wherein the controller is further configured to generate the neural network model by:
      obtaining a second output digital signal upscaled from a second input digital signal based on the difference and the second input digital signal,
   wherein the controller is further configured to generate the first input digital signal and the second input digital signal by pre-processing a first reference digital signal and a second reference digital signal, respectively, and
   wherein, to pre-process the first reference digital signal and the second reference digital signal, respectively, the controller is further configured to:
      encode each of the first reference digital signal and the second reference digital signal,
      add noise to the encoded first reference digital signal and the encoded second reference digital signal, and
      decode each of the noise-added encoded first reference digital signal, and the noise-added encoded second reference digital signal.

2. The device of claim 1, wherein a sampling rate of the first reference digital signal and a sampling rate of the second reference digital signal are higher than a sampling rate of the first input digital signal and a sampling rate of the second input digital signal, respectively.

3. A method for wireless communication, the method comprising:
   determining a weight based on a first input digital signal;
   identifying at least one additional sample using a neural network model, based on the first input digital signal and the weight; and
   upscaling the first input digital signal by adding the identified at least one additional sample to a plurality of samples of the first input digital signal,
   wherein the neural network model modifies the weight to reduce a difference between the upscaled first input digital signal and a reference digital signal,
   wherein the difference is obtained based on at least one sample of the reference digital signal which does not correspond to any of the plurality of samples of the upscaled first input digital signal,
   wherein the method further comprises generating the neural network model,
   wherein the generating of the neural network model includes:
      obtaining a second output digital signal upscaled from a second input digital signal based on the difference and the second input digital signal,
   wherein the method further comprises generating the first input digital signal and a second input digital signal by pre-processing a first reference digital signal and a second reference digital signal, respectively, and
   wherein the generating of the first input digital signal and the second input digital signal includes:
      encoding each of the first reference digital signal and the second reference digital signal;
      adding noise to the encoded first reference digital signal and the encoded second reference digital signal; and
      decoding each of the noise-added encoded first reference digital signal, and the noise-added encoded second reference digital signal.

4. The method of claim 3, wherein a sampling rate of the first reference digital signal and a sampling rate of the second reference digital signal are higher than a sampling rate of the first input digital signal and a sampling rate of the second input digital signal, respectively.

5. A non-transitory computer-readable medium storing a program thereon for managing a device, wherein the program, when executed by a controller of the device, causes the device to:
   determine a weight based on a first input digital signal;
   identify at least one additional sample using a neural network model, based on the first input digital signal and the weight; and
   upscale the first input digital signal by adding the identified at least one additional sample to a plurality of samples of the first input digital signal,
   wherein the neural network model modifies the weight to reduce a difference between the upscaled first input digital signal and a reference digital signal,
   wherein the difference is obtained based on at least one sample of the reference digital signal which does not correspond to any of the plurality of samples of the upscaled first input digital signal,
   wherein the program, when executed by the controller, further causes the device to generate the neural network model by obtaining a second output digital signal upscaled from a second input digital signal based on the difference and the second input digital signal,
   wherein the program, when executed by the controller, further causes the device to generate the first input digital signal and the second input digital signal by pre-processing a first reference digital signal and a second reference digital signal, respectively, and
   wherein, to pre-process the first reference digital signal and the second reference digital signal, respectively, the program, when executed by the controller, further causes the device to:
      encode each of the first reference digital signal and the second reference digital signal;
      add noise to the encoded first reference digital signal and the encoded second reference digital signal; and
      decode each of the noise-added encoded first reference digital signal, and the noise-added encoded second reference digital signal.

6. The non-transitory computer-readable medium of claim 5, wherein a sampling rate of the first reference digital signal and a sampling rate of the second reference digital signal are higher than a sampling rate of the first input digital signal and a sampling rate of the second input digital signal, respectively.

* * * * *